United States Patent
Odachowski

(10) Patent No.: US 6,976,318 B2
(45) Date of Patent: Dec. 20, 2005

(54) TAPE MEASURE

(76) Inventor: Mark Odachowski, 12414 Old Bridge Rd., Ocean City, MD (US) 21842

( * ) Notice: Subject to any disclaimer, the term of this patent is extended or adjusted under 35 U.S.C. 154(b) by 0 days.

(21) Appl. No.: 10/869,771

(22) Filed: Jun. 16, 2004

(65) Prior Publication Data

US 2004/0250437 A1 Dec. 16, 2004

Related U.S. Application Data

(60) Provisional application No. 60/478,243, filed on Jun. 16, 2003.

(51) Int. Cl.$^7$ .............................................. G01B 3/10
(52) U.S. Cl. .............................. 33/759; 33/761; 33/769
(58) Field of Search ................... 33/755, 757, 759–766, 33/768–770; D10/72

(56) References Cited

U.S. PATENT DOCUMENTS

| | | | | |
|---|---|---|---|---|
| 1,081,673 A | 12/1913 | Kueffel | ......................... | 33/755 |
| 1,169,413 A * | 1/1916 | Lyons | ......................... | 33/403 |
| 1,986,551 A | 1/1935 | Anderson | ..................... | 33/769 |
| 2,446,020 A * | 7/1948 | Ragnar et al. | ............ | 242/396.5 |
| 2,503,440 A * | 4/1950 | Johanningmeier | .......... | 242/380 |
| 3,164,907 A | 1/1965 | Quenot | ........................ | 33/767 |
| 3,270,421 A | 9/1966 | Jones | ........................ | 33/759 |
| 3,289,305 A | 12/1966 | Norton | ........................ | 33/759 |
| 3,686,767 A | 8/1972 | Duda et al. | ..................... | 33/769 |
| 3,713,603 A * | 1/1973 | Shore | .......................... | 242/375 |
| 3,774,309 A | 11/1973 | Leopoldi | ..................... | 33/769 |
| 3,908,277 A | 9/1975 | Rutty | .......................... | 33/769 |
| 4,153,996 A | 5/1979 | Rutty | .......................... | 33/767 |
| 4,194,703 A | 3/1980 | Roe | ......................... | 242/381.3 |
| 4,352,244 A | 10/1982 | Tomuro | ........................ | 33/757 |
| 4,439,927 A | 4/1984 | Elliott | ........................ | 33/668 |
| 4,462,160 A | 7/1984 | Cohen et al. | ................ | 33/760 |
| 4,527,334 A * | 7/1985 | Jones et al. | .................... | 33/761 |
| 4,565,005 A * | 1/1986 | Naka | ........................... | 33/1 G |
| 4,696,110 A | 9/1987 | Walker et al. | ................ | 33/759 |
| 4,748,746 A | 6/1988 | Jacoff | ........................ | 33/761 |
| 4,907,348 A * | 3/1990 | Hubbard, Jr. | ................ | 33/767 |
| 4,938,430 A | 7/1990 | Chapin | ..................... | 242/381.3 |
| 5,210,956 A | 5/1993 | Knispel | ........................ | 33/761 |
| 5,606,803 A * | 3/1997 | O'Sullivan | .................... | 33/770 |
| 5,718,056 A | 2/1998 | Miyasaka et al. | ............. | 33/761 |
| 5,894,677 A * | 4/1999 | Hoffman | ........................ | 33/758 |
| 5,913,586 A | 6/1999 | Marshall | ........................ | 33/759 |
| 5,983,514 A | 11/1999 | Lindsey | ........................ | 33/760 |
| 6,158,138 A * | 12/2000 | Katz | ........................... | 33/760 |
| 6,442,863 B1 * | 9/2002 | Poineau et al. | ............... | 33/758 |
| 6,477,785 B1 * | 11/2002 | Hsu | ............................ | 33/761 |
| 6,598,310 B1 | 7/2003 | Odachowski | ................ | 33/755 |
| 6,651,354 B1 | 11/2003 | Odachowski | ................ | 33/755 |
| 6,860,031 B2 * | 3/2005 | Odachowski | ................ | 33/755 |

* cited by examiner

*Primary Examiner*—R. Alexander Smith
(74) *Attorney, Agent, or Firm*—Larry J. Guffey

(57) ABSTRACT

An improved retractable tape measure has, according to a preferred embodiment of the present invention, the features of a standard measure, including a housing with front and rear sides, a boundary edge and a tape opening, a retractable measuring tape positioned within this housing, with the tape having a free end that extends through the housing's opening, plus the improvements yielded by: (a) configuring the housing sides to be tear-drop shaped with a tip end, and (b) locating the tape opening in a portion of the boundary edge proximate the tape's tip end.

15 Claims, 4 Drawing Sheets

TAPE MEASURE

CROSS-REFERENCE TO RELATED APPLICATIONS

This application claims the benefit of U.S. Provisional Patent Application No. 60/478,243, filed Jun. 16, 2003.

BACKGROUND OF THE INVENTION

1. Field of the Invention

The present invention generally relates to geometrical instruments for measuring distance. More particularly, this invention relates to an improved retractable, tape measure.

2. Description of the Related Art

Retractable tape measures have been popular for many years and have often been the subject of patent grants. For example, see U.S. Pat. Nos. 3,908,277, 4,153,996, 4,194,703, 4,439,927, 4,748,746, 4,938,430, 5,210,956 and 5,983,514.

In general, a retractable tape measure includes some widely recognized features, including: a metal tape that is retractably mounted within a housing, a retraction means for retracting the tape through a housing opening, an end stop for preventing the free end of the tape from retracting into the housing, and a lock which releasably secures the tape in an extended position. In order to provide stiffness to such a tape so that it's free end can extended to a maximum distance from its housing without bending, the tape is usually manufactured with lateral cross-section curvature created by having the tape's edges being turned upward. This curvature also serves to differentiate the top side of the tape.

All of the above referenced tapes also share some other, not so widely recognized, features which serve to significantly limit their usefulness. These features include all these tapes having: (1) retractable tapes that extend from their housings at a point on the side of the front side of the housings which is proximate the housing's bottom surface, and (2) measurement indicia on only the top surface of the tape.

The reason for these features is apparently that such tapes are primarily intended for use in making measurements on surfaces or in horizontal planes that are lower than the eye level of the user, and where there are no obstructions above the plane of a desired measurement which would necessitate a user having to bend the tape downward so as to reposition the top portion of a tape's housing out of the way of such an obstruction. The logic of this last statement becomes apparent when it is recognized that the turned upward edges of the tape destroys its vertical symmetry, and means that such a tape cannot just be turned over, so as to make the tape's top surface indicia visible or to reposition the top portion of the housing out of the way of an obstruction, without losing the stiffening and avoidance-to-bending characteristics provided by the tape's turned upward edges.

Thus, despite their popularity, such standard tape measures are not always easy to use. For example, electricians and others often encounter significant problems in using a standard tape measure when they are making measurements from a wall to a distant spot that is more than an arms length away on an adjoining ceiling. See FIG. 1–2. The first obstacle encountered is the lack of any markings on the tape's bottom side. Meanwhile, the numbers on the tape's top side cannot be seen by its user while he/she is holding the tape up against the ceiling. Unfortunately, as noted above, the tape cannot be turned over or the top portion of the tape's housing moved away from the ceiling without losing the stiffening effect of the tape's turned-up edges.

U.S. Pat. No. 1,986,551 discloses a steel, retractable tape which has indicia on the tape's bottom surface and at least some degree of lateral cross-section curvature. However, this tape measure differs from most of the others in that it has some unique, essential elements. For example, the end stop of this tape measure is rotatable to allow for the making "inside and outside" measurements. Similarly, the opening for this tape measure is unusual in that it can be interpreted as having a continuous boundary edge that extends from 34,' where the edge of the housing forms a line at which "inside" measurements are taken, and follows the inside edges of the guide shoes 14 and 15 so as to ensure that "all of the graduations and all of the numbers (on the tape) are fully exposed and easily readable."

Thus, despite this prior art, one finds that standard, tape measures are not very user friendly. The need exists for an improved, retractable tape measure that is easier to use.

3. Objects and Advantages

There has been summarized above, rather broadly, the prior art that is related to the present invention in order that the context of the present invention may be better understood and appreciated. In this regard, it is instructive to also consider the objects and advantages of the present invention.

An object of the present invention is to provide an improved, retractable tape measure that will overcome user problems such as the ones described above.

Another object of the present invention is to provide an improved, retractable tape measure that can be used, for measuring extended distances, just as easily when those distances are on a ceiling or a floor.

A further object of the present invention is to provide an improved, retractable tape measure that users can utilize without having any preconceived notions as to what should be the top and bottom surfaces of the tape measure.

Other objects and advantages of the present invention will become readily apparent as the invention is better understood by reference to the accompanying drawings and the detailed description that follows.

SUMMARY OF THE INVENTION

The present invention is generally directed to satisfying the need set forth above and the problems identified with prior retractable, tape measures.

A preferred embodiment of the present invention is an improved, retractable tape measure. It is an improvement of the standard retractable tape measure which has a housing with front and rear sides, a boundary edge and a tape opening, a retractable measuring tape positioned within this housing, with the tape having a free end that extends through the housing's opening, and an end stop mounted on the tapes free end. Such a tape is seen to be improved by: (a) configuring the housing sides to be tear-drop shaped with a tip end, and (b) locating the tape opening in a portion of the boundary edge proximate the tape's tip end.

A second preferred embodiment of the present invention further includes the steps of: (c) providing the boundary edge with a longitudinal slot proximate the tape's opening, (d) providing a slidable member having a front end and a rear end and slidably mounting this member proximate the boundary slot so that the member is movable between a first position and a second position, and (e) configuring the member and the slot so that when the member is slid forward to its first position the front end of the member comes into contact with the tape's bottom surface and causes the tape to be bend outward in the direction of the member's movement, and, when this member is retracted into its second position, its front end is retracted a distance such that the member's front end does not contact and cause the bending of the tape.

Other embodiments of the present invention will become readily apparent as the invention is better understood by reference to the accompanying drawings and the detailed description that follows.

DESCRIPTION OF THE PREFERRED EMBODIMENT

Figure 3A:
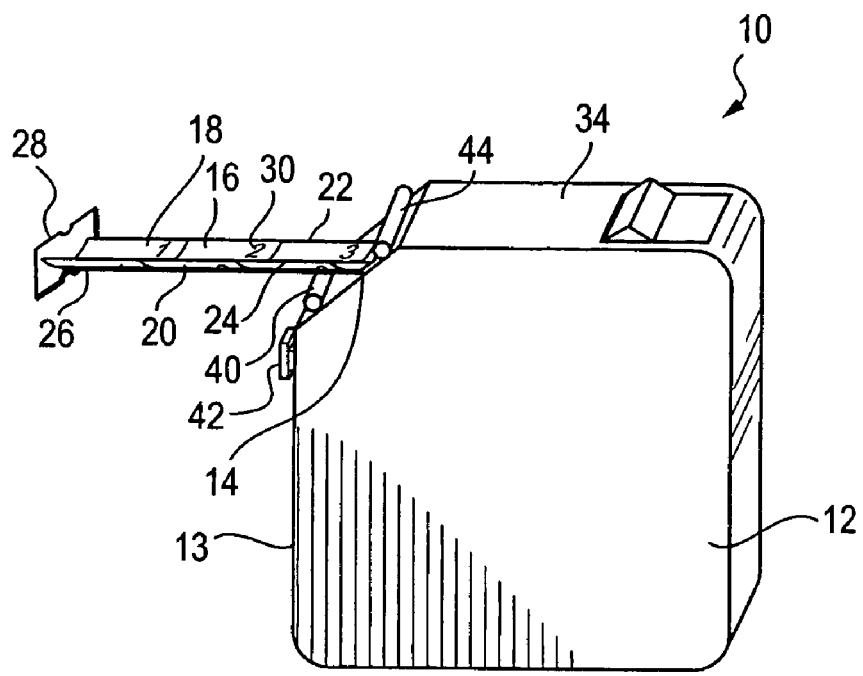
FIG. 3A is a perspective view of an embodiment of the present invention in its first mode of use in which the tape extends parallel to the top edge of its housing.
Figure 3B:
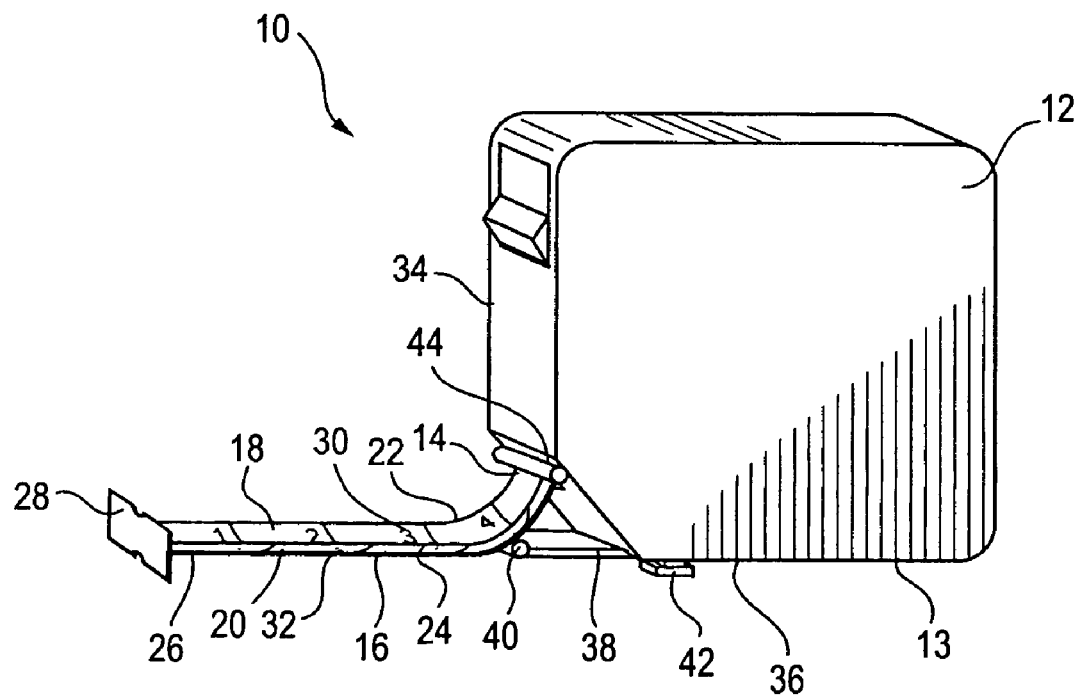
FIG. 3B is a perspective view of the embodiment shown in FIG. 3A in which it is being used in a second mode of use in which the tape extends perpendicular to the top edge of its housing.

Referring now to the drawings wherein are shown preferred embodiments and wherein like reference numerals designate like elements throughout, there is shown in FIGS. 3A and 3B a perspective view of an improved retractable, tape measure 10 that has two distinct modes of operation as illustrated in the respective FIGS. 3A and 3B.

This embodiment includes an approximately rectangular housing 12 having an opening 14, a retractable measuring tape 16 with top 18 and bottom 20 surfaces, edges 22, 24 that turn upward so as to stiffen the tape 16 from being bent downward by the force of gravity, and a free end 26 that extends through the opening 14.

This embodiment further includes an end stop 28 that is mounted on the tape's free end 26, and top measurement indicia 30 that are inscribed on the top surface 18 of the measuring tape 16. This end stop is notable for having an upper finger that extends above the tape's top surface and a lower finger that extends below the tape's bottom surface.

This embodiment is seen to be have been improved by the inclusion of bottom measurement indicia 32 on the bottom surface 20 of the measuring tape 16, and the location of the housing opening 14 in the front portion 13 and proximate the top portion 34 of the housing 12 so that, when the tape measure 10 is being used to measure against an overhead surface with the edges 22, 24 being held adjacent the overhead surface, the portion of the tape 16, that extends through the opening 14 and is in closest proximity to the housing 12, can be held in close proximity to the overhead surface without having to bend the tape 16 to move the housing 12 away from the overhead surface. Note that a section of the top portion of the housing is also intended to be held proximate a to-be-measured object.

Additionally, this embodiment has a slot 36 in the front surface 13. Beneath this slot lies a blade-like member 38 that is slidably attached to this front surface 13. This member is slidable between a forward or extended position and a rear or retracted position. At its forward end, this member has a roller 40, or other similar mechanism that is suitable for reducing sliding friction, that is oriented transverse to the member's direction of movement and is connected to the end in such a manner that it can rotate. Extending from the member 38 and protruding through the slot 36 is a locking knob 42 that when depressed allows the member to be slid either forward or backwards. A roller 44, or other similar mechanism that is suitable for reducing sliding friction, that is similar to that located on the end of this member 38 is located on the top edge of the housing's opening 14.

The purpose of this member 38 is to deform the tape 16 at a point proximate the housing's opening 14 so that the tape exits the housing not parallel to its top surface 34, but parallel to its front surface 13 when it is desired to use the tape to make measurements on a surface that will lie below the tape when the measurement is being made—such as shown in FIG. 3B where the housing has been rotated ninety degrees counterclockwise from its orientation shown in FIG. 3A.

To create the desired tape deformation, the member 38 is slid forward so that the roller 40 on its forward end comes into contact with the bottom 20 of the tape and forces it to move forward until it assumes a direction that is parallel to that of the front surface 13 or the direction of travel of the member. It can be noted that because of the way that the tape is rolled on its spool within the housing (which is the reverse of how most retractable tapes are wound), the tape bends easily forward.

Figure 4:
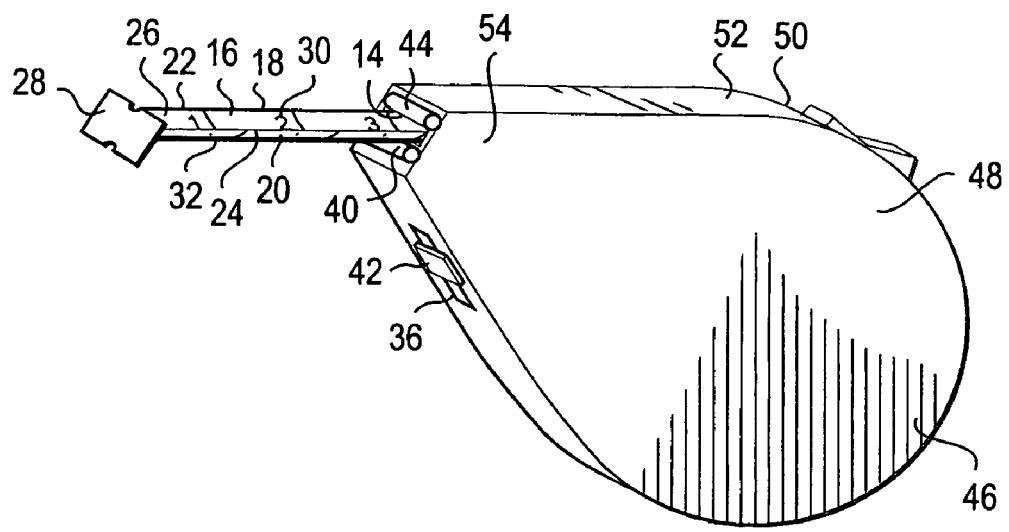
FIG. 4 is a perspective view of an embodiment of the present invention when it is oriented to be used to make a measurement against an overhead surface.
Figure 5:
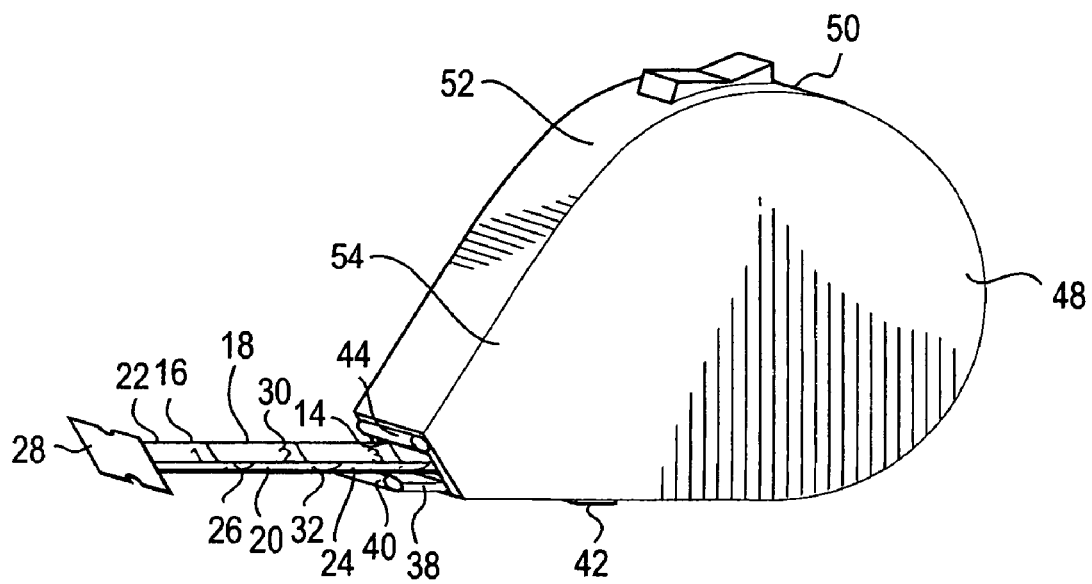
FIG. 5 is a perspective view of the embodiment of FIG. 4 after it has been reoriented to be used to make a measurement against a surface that is below the level of the extended tape; its slide member has been moved forward to cause the tape to be deformed horizontally at the housing's opening.

Another embodiment of the present invention is shown in FIGS. 4–5. In this instance, the shape of the housing 46 has been significantly changed from that of the standard rectangular-shaped housing and into one in which the side view of the housing is what I refer to as "tear-drop" shaped. The other basic elements of this embodiment are the same as those shown in FIG. 3A–3B, except for the shape of the housing with its tear-shaped front 48 and rear 50 sides and its boundary edge 52.

Figure 1:
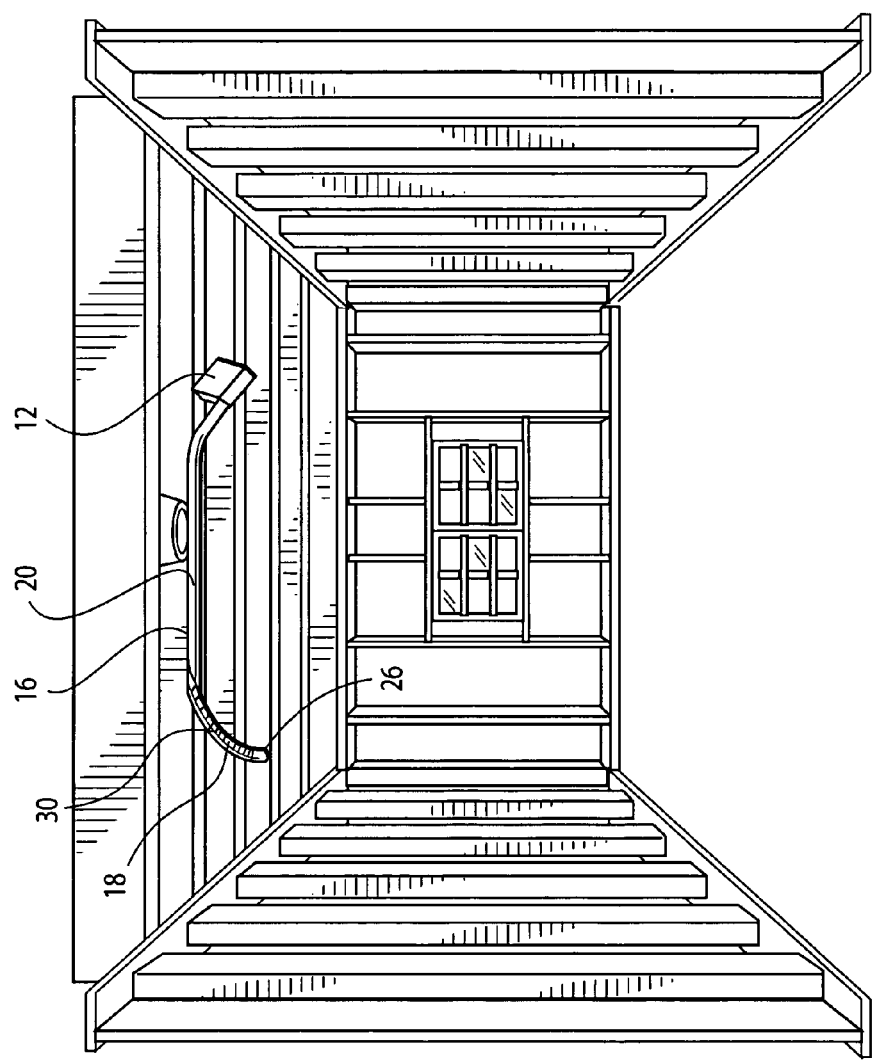
FIG. 1 is a perspective view of a standard, retractable tape measure as it is being used to make a measurement beneath a ceiling.
Figure 2:
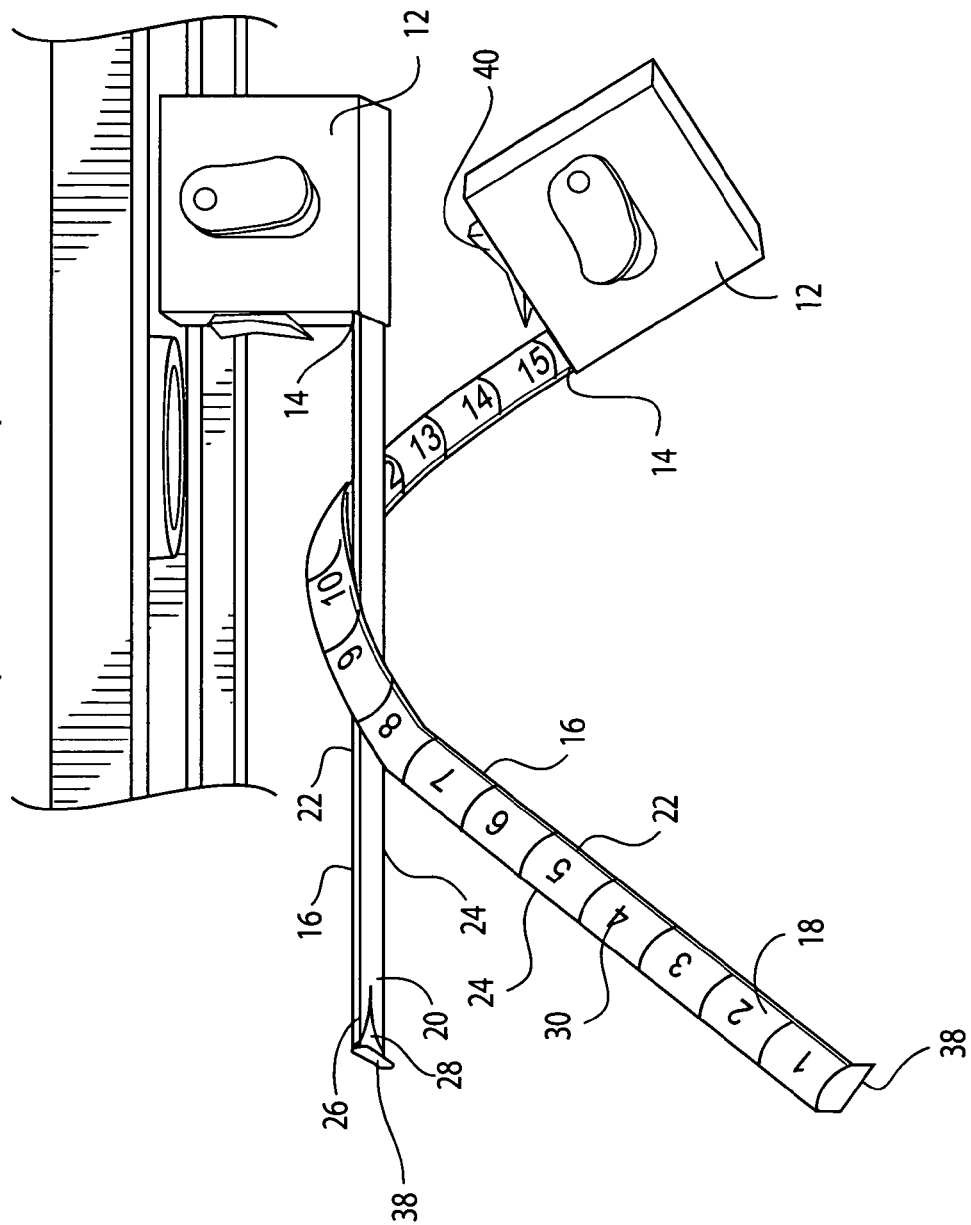
FIG. 2 is a perspective view of a standard tape measure showing some of the problems that can be encountered in using such a tape measure.

For such a shape, the housing's opening 14 is located at a point on the edge of the housing 46 that is proximate the effective tip end 54 of the tear-drop. A significant advantage of this shape is that this housing no longer has edge surfaces that are easily distinguishable as its top and bottom portions, as is the case for a standard, rectangular shaped tape measure housing. These edge distinctions were found to inevitably lead users of rectangularly shaped housings to hold them in predominantly one preferred orientation when in use (i.e., such that their retractable tapes exit proximate the housing's bottom edge, see FIGS. 1–2).

This preference in housing orientations tended to be a problem with respect to the acceptance in the marketplace for the applicant's earlier versions (see U.S. Pat. No. 6,651,354, issued Nov. 25, 2003 and titled "Tape Measure," U.S. Pat. No. 6,598,310, issued Jul. 29, 2003 and titled "Retractable Tape Measure," and U.S. Ser. No. 10/327,150, filed Dec. 20, 2002, and titled "Improved Tape Measure") of improved, retractable tape measures. This problem arises because one aspect of the uniqueness of these new tape measures is that they place the housing's opening proximate a housing's top surface, as opposed to that of the standard tape measure whose opening is proximate its bottom surface. Consequently, the users of these new tape measures tended to not want to turn them in an orientation that they considered to be "upside down," from their perceived intended orientation for use, when making overhead measurements.

As previously noted, the "tear-drop" shaped embodiment of the present invention which is shown in FIGS. 4–5 resolves this user-preferred orientation problem by effectively eliminating any clearly distinguishable top and bottom portions of a tape measure housing.

In FIG. 4, the present invention is shown in an orientation that makes it especially useful for making overhead measurements. Unlike the tape measures shown in FIGS. 1–2, the retractable tape near the housing's opening doesn't have to be bend downward to prevent the housing from being in the way of a to-be-measured overhead surface.

FIG. 5 shows the embodiment of FIG. 4 after it has been rotated counterclockwise through an angular rotation of approximately 45 degrees and its slide member 38 moved forward so as to cause the tape to be deformed horizontally at the housing's opening. In such an orientation, this embodiment is situated so that the tape measure can be used to make measurements on surfaces which are below the extended tape.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the following claims.

What is claimed is:

1. A retractable tape measure comprising:
    a housing having front and rear sides and a boundary edge, said sides being tear-drop shaped and having a tip end, said housing having a tape opening in a portion of said boundary edge proximate said tip end,
    a retractable measuring tape positioned within said housing, said tape having a free end that extends through said opening,
    an end stop mounted on said free end,
    said boundary edge having a longitudinal slot proximate said opening,
    a slidable member having a front end and a rear end, said member being slidably mounted proximate said slot so as to be movable between a first position and a second position,
    wherein said member and said slot being configured so that when said member is slid forward to said first position the front end of the said member comes into contact with the bottom of said tape and causes said tape to be bent outward in the direction of movement of said member, and when said member is retracted into said second position the front end of said member is retracted a distance such that said member front end does not contact and cause the bending of said tape.

2. A retractable tape measure as recited in claim 1, further comprising:
    a first means for reducing sliding friction, said means being located on the front end of said slidable member.

3. A retractable tape measure as recited in claim 2, further comprising:
    a second means for reducing sliding friction, said second means being located on the opposite side of said opening from where said slidable member is located.

4. A retractable tape measure as recited in claim 3, further comprising:
    a top measurement indicia inscribed on the top surface of said measuring tape, and
    a bottom measurement indicia inscribed on the bottom surface of said measuring tape.

5. A retractable tape measure as recited in claim 4, wherein said end stop having an upper finger that extends above said tape top surface and a lower finger that extends below said tape bottom surface.

6. A retractable tape measure comprising:
    a housing having front and rear sides, a boundary edge and a top portion having a section which is to-be-placed proximate a surface of an object to be measured, said housing having a tape opening in a portion of said boundary edge proximate said top portion,
    a retractable measuring tape positioned within said housing, said tape having a free end that extends through said opening,
    said boundary edge having a longitudinal slot proximate said opening,
    a slidable member having a front end and a rear end, said member being slidably mounted proximate said slot so as to be movable between a first position and a second position,
    wherein said member and said slot being configured so that when said member is slid forward to said first position the front end of said member comes into contact with the bottom of said tape and causes said tape to be bent outward in the direction of movement of said member, and when said member is retracted into said second position the front end of said member is retracted a distance such that said member front end does not contact and cause the bending of said tape.

7. A retractable tape measure as recited in claim 6, further comprising:
    a first means for reducing sliding friction, said means being located on the front end of said slidable member.

8. A retractable tape measure as recited in claim 7, further comprising:
    a second means for reducing sliding friction, said second means being located on the opposite side of said opening from where said slidable member is located.

9. A retractable tape measure as recited in claim 8, further comprising:
    a top measurement indicia inscribed on the top surface of said measuring tape, and
    a bottom measurement indicia inscribed on the bottom surface of said measuring tape.

10. A retractable tape measure as recited in claim 9, further comprising:
    an end stop mounted on said tape free end,
    wherein said end stop having an upper finger that extends above said tape top surface and a lower finger that extends below said tape bottom surface.

11. An improved method of constructing a retractable tape measure having a housing with front and rear sides, a boundary edge and a tape opening, a retractable measuring tape positioned within said housing and having a free end that extends through said opening, and an end stop mounted on said tape free end, said improved method comprising the steps of:
    configuring said housing sides to be tear-drop shaped with a tip end,
    locating said tape opening in a portion of said boundary edge proximate said tip end, providing said boundary edge with a longitudinal slot proximate said opening, providing a slidable member having a front end and a rear end, slidably mounting said member proximate said slot so as to be movable between a first position and a second position, and configuring said member and said slot so that when said member is slid forward to said first position the front end of said member comes into contact with the bottom of said tape and causes said tape to be bent outward in the direction of movement of said member, and when said member is retracted into said second position the front end of said member is retracted a distance such that said member front end does not contact and cause the bending of said tape.

12. An improved method of constructing a retractable tape measure as recited in claim 11, further comprising the step of:

mounting on the front end of said slidable member a first means for reducing sliding friction.

13. An improved method of constructing a retractable tape measure as recited in claim 12, further comprising the step of:

mounting on the opposite side of said opening from where said slidable member is located a second means for reducing sliding friction.

14. An improved method of constructing a retractable tape measure as recited in claim 13, further comprising the step of:

inscribing top and bottom measurement indicia on the respective top and bottom surfaces of said measuring tape.

15. An improved method of constructing a retractable tape measure as recited in claim 14, further comprising the step of:

configuring said end stop to have an upper finger that extends above said tape top surface and a lower finger that extends below said tape bottom surface.

* * * * *